United States Patent Office 3,111,959
Patented Nov. 26, 1963

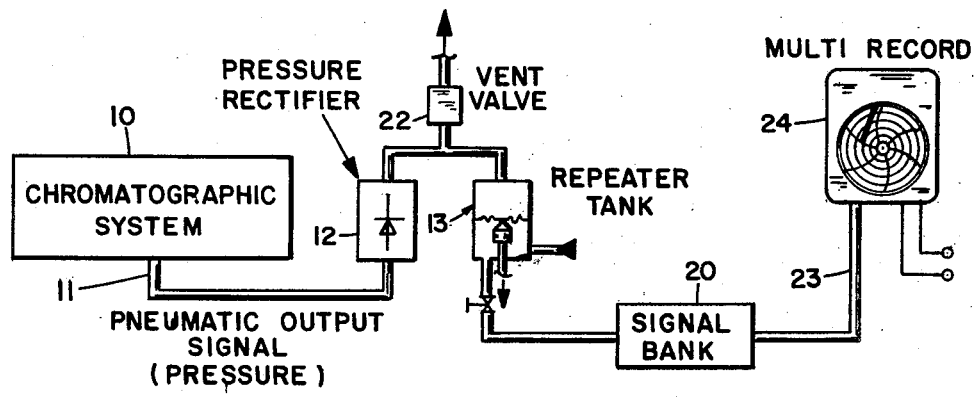
FIG. I
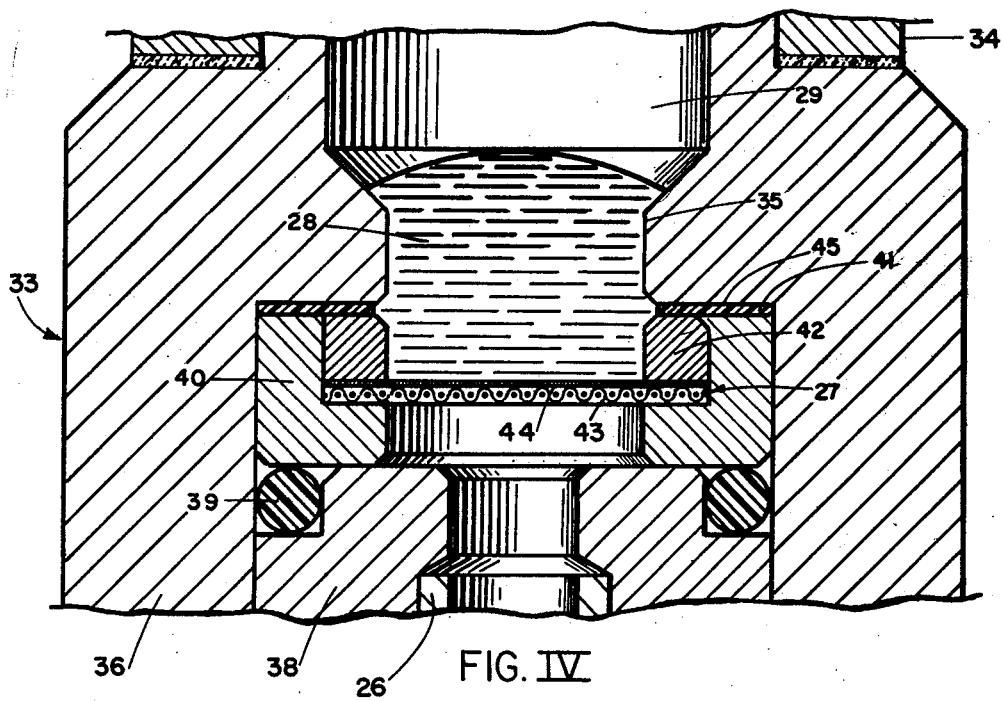
FIG. IV
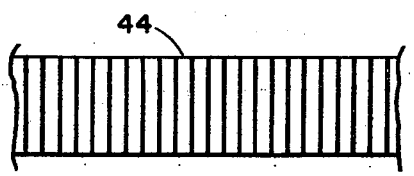
FIG. V

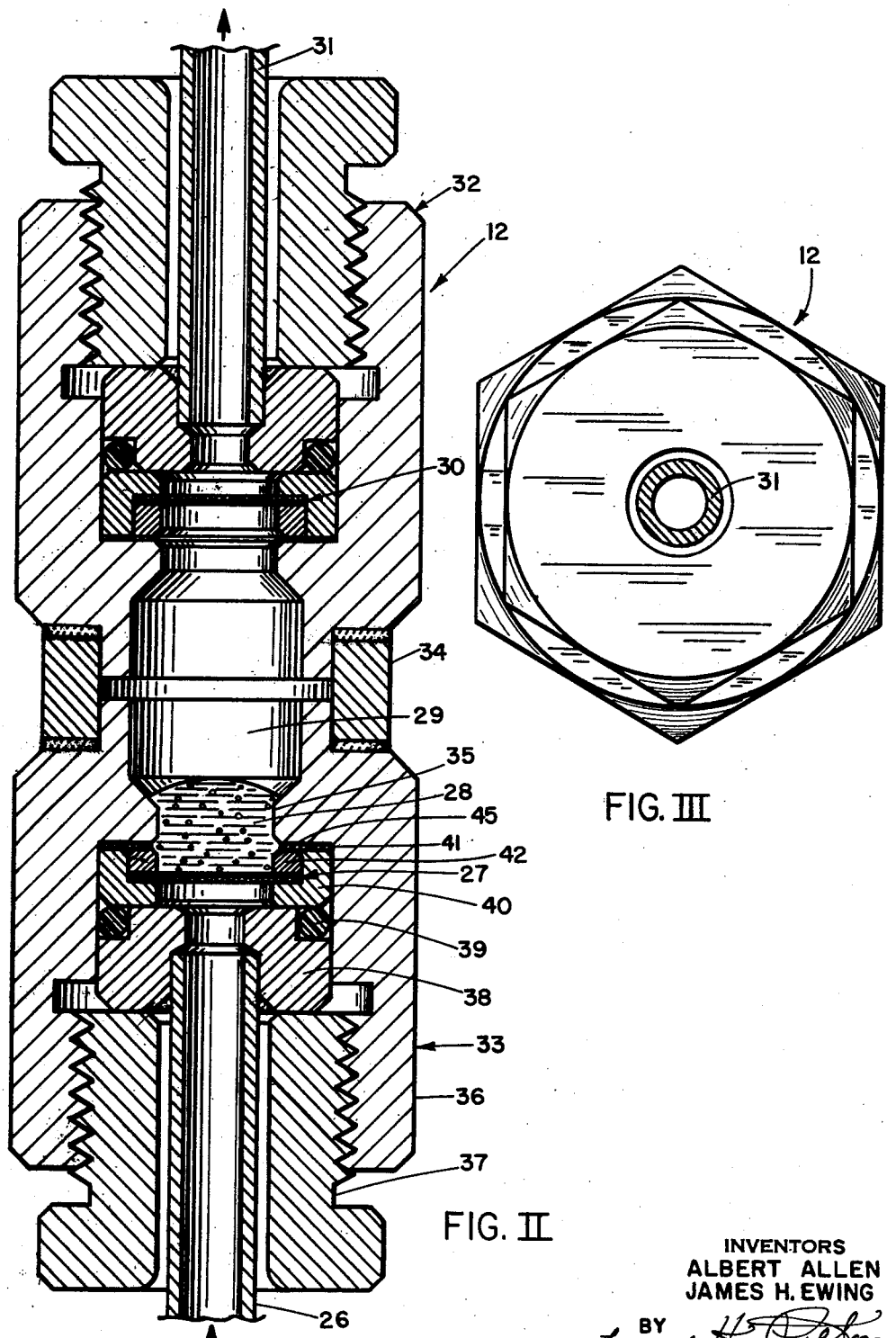

3,111,959
PNEUMATIC PRESSURE RECTIFIER
Albert Allen, Sharon, and James H. Ewing, Foxboro, Mass., assignors to The Foxboro Company, Foxboro, Mass., a corporation of Massachusetts
Filed Oct. 4, 1960, Ser. No. 60,437
1 Claim. (Cl. 137—251)

This invention relates to pneumatic rectifiers, for use in gas flow and pressure systems, and is particularly exemplified by a pneumatic trap device in the form of a mercury check valve for gas pressure trapping, as for example, in a maximum pressure memory system.

An example of an application of the device of this invention is its use in the field of chromatography. Chromatographic analysis involves the sorptive separation of components of a fluid mixture. Such separated components are detected, and then measured.

In one form of measurement device for such arrangements, the various component value or condition signals may appear as pneumatic values, for example, pressures.

It is often desirable to temporarily store such values, for example, as maximum pneumatic pressures, and several such values may be stored, and thereafter suitable readout devices may pick off the stored values for recording or other action.

Also, when only one pneumatic pressure is involved, or of interest, it is often desirable to determine the maximum value of such pressure.

This invention provides a mercury check valve for accomplishing such pneumatic trapping, with the check valve providing rectifier action.

A feature of this invention is the use of a mercury supporting filter with short, small diameter, straight, and uniform passages therethrough to provide a high percentage of voids and yet prevent mercury passage or bleeding therethrough under operating range pressures.

It is therefore an object of this invention to provide a new and useful pneumatic pressure rectifier.

Further objects and advantages of this invention will be in part apparent and in part pointed out hereinafter and with respect to the drawings, in which:

FIGURE I is a schematic illustration of a chromatographic including a pneumatic trap system embodying this invention;

FIGURE II is a vertical central section of a pneumatic check valve assembly according to this invention;

FIGURE III is a top view of the structure of FIGURE II, as if it were unsectioned;

FIGURE IV is a fragmentary enlargement of the mercury portion of the structure of FIGURE II; and FIGURE V is a fragmentary enlargement of FIGURES II and IV.

The FIGURE I chromatographic system embodiment of the pneumatic trap according to this invention comprises, in schematic illustration, a chromatographic system 10 with a pneumatic output through pipe 11 leading to a pressure rectifier 12 which embodies, as will be discussed hereinafter, a mercury check valve assembly according to this invention.

The output of the FIGURE I pressure rectifier 12 is a pneumatic signal applied to a repeater tank 13 for storage and readout. The outlet of the repeater tank is through a pipe 19 leading to a signal bank 20. Between the repeater tank 13 and the pressure rectifier 12, there is a vent valve of any suitable form as at 22. The signal bank 20 is any suitable arrangement for separately storing a series of signals. The outlet of the signal bank 20 is through a pipe 23 to a suitable multi-recorder 24.

The remaining FIGURES II through V are illustrations of a mercury check valve in detail of the pressure rectifier 12 of FIGURE I.

In the FIGURE II showing of the pressure rectifier 12, it is shown as a vertically disposed device with a gas passage vertically disposed therethrough with pressure applied through an entrance pipe 26 at the bottom thereof, and upward through a combination support screen and filter arrangement 27, then further upward by bubbling through a a body of mercury 28 and into an enlargement chamber 29. Further passage of the fluid pressure upward through the rectifier device is through another portion of the enlarged chamber 29 and through a second arrangement of filter and screen as at 30, with this filter and screen a duplicate of the combination item 27, except reversed in that the upper combination 30 has the filter on the bottom and the screen on the top so that when the overall device is reversed vertically the flow may enter from what is shown in FIGURE II as the top and exit from what is shown in FIGURE II as the bottom.

Further in reference to FIGURE II, and in reference to the fluid pressure connection upward therethrough above the second filter and screen combination 30, the pressure passage continues as an exit passage 31. In the instance as shown, the input passage 26, is the inlet from the FIGURE I pipe 11 of the chromatographic system 10 and the FIGURE II output pipe 31 applies the output of the rectifier to the repeater tank input chamber 14 (FIGURE I).

The FIGURE II assembly comprises a pair of duplicate units, a top unit 32 and a bottom unit 33 joined into the single overall unit 12 by a welded ring 34. Thus the bottom unit 33 is mirrored by the top unit 32 with the screen and filter 30 in the top unit in the reverse of the screen and filter 27 in the bottom unit. That is the filter and screen assembly 30 in the top unit is the same as the filter and screen assembly 27 in the bottom unit except their positions are vertically reversed so that the overall unit 12 may be turned upside down, the gas entrance and check valve arrangement then being associated with the filter and screen 30 on which the mercury body 28 would find itself. Thus the device of FIGURE II is reversible.

At the same time, in the attitude of the FIGURE II device as shown, the filter and screen assembly 30 of the top portion 32 provides a blocking arrangement to prevent the mercury body 28 from being forced out of the unit through the outlet pipe 31, for example by a sudden surge of pressure in the input pipe 26.

The enlargement 29 provides the advantage of allowing the mercury body 28 to be spread thin as it may be moved upward by sudden surge of input pressure so that the sudden surge of gas would break through the mercury and escape rather than impinging the mercury as a body up against the filtering screen assembly 30. In this latter case, in a device not having an enlargement such as 29, the mercury could easily impinge on the filtering screen unit 30 as a body and then some of the mercury may drop downward to establish an air bubble between the two bodies of mercury and create difficulties and errors in the system.

The body of mercury 28 is formed generally in mushroom shape, with a portion of the body in the enlargement 29 and a portion in a cylindrical portion of the gas passage just below the enlargement 29. It is believed that this arrangement aids in preventing back pressure leakage past the mercury body 28 since the enlargement 29 is formed by an outflaring arrangement with an annular line defining the start of the flare as at 35. It is believed that this sharp annular edge creates tension areas in the periphery of the body of mercury which aid in sealing off back pressure down the walls of the passage past the mercury body 28. It is believed also that the angle of contact of the mercury with the outward flare of the enlargement 29 is such as to make it more difficult for a fluid pressure to pass between the mercury and the passage wall downward than if the mercury were entirely in a cylindrical passage.

The lower body 33 comprises a main sleeve 36 with a threaded concentric insert mounted in the end thereof as at 37. The insert 37 abuts its top, inner end on a sleeve 38 which, through an O-ring 39, an angled ring 40, a sealing washer 41, and another metal ring 42, all in combination, provides a mounting arrangement in support of the screen and filter combination 27 upon which the body of mercury 28 rests. Thus the input pressure is applied or put through input passage 26 through the screen and filter combination 27 and the gas bubbles up through the mercury body 28, through the enlargement 29 and into the output passage 31.

This is a useful pressure transfer device for determining and retaining a maximum value of a particular pressure situation.

The top portion of the unit of FIGURE II, that is the unit 32, is identical with the bottom portion 36 and identification numbers have been omitted.

Referring to FIGURES IV and V the screen and filter assembly 27 comprises a screen 43 and a filter 44. The screen is mounted transversely of the passage upward through the device and rests on a shoulder of the angled ring 40. The filter 44 rests flat on the screen 43 and is held downward thereupon by the ring 42, the whole being held together by the FIGURE II mounting sleeve 37 pressing upward against the sleeve 38. This whole assembly is backed up by a downward facing flange 45 against which the sealing ring 41 is abutted.

The screen 43 is a supporting member for the filter 44 and the gas passes freely through this screen in either direction.

The filter 44 may be very useful in this device when specially formed. Such formation has many uniform openings vertically therethrough, as essentially cylindrical openings with very small diameters, and very small thickness dividing walls, as shown in FIGURE V, so that the diameter of the various openings is uniform, the length of the various openings is short and uniform, and the opennigs are straight. The percentage of voids in the filter is high, of the order of 80%. The walls dividing the openings are not much thicker than molecules. The filters look like thin sheets of paper and are made up of cellulose base chemicals. There may be, for example, about 50 million pores per square centimeter of cross section.

This invention therefore provides a new and useful pneumatic rectifier.

As many embodiments may be made of the above invention, and as changes may be made in the embodiments set forth above, without departing from the scope of the invention, it is to be understood that all matter hereinbefore set forth or shown in the accompanying drawings is to be interpreted as illustrative only and not in a limiting sense.

We claim:

A pneumatic pressure rectifier comprising a vertically disposed gas passage having an upright funnel shape therein formed by a cone and a deep cylinder with a sharp angled juncture forming an essentially circular line, an entirely fluid body wholly transversely filling said gas passage and comprising a body of mercury lying vertically in small part in the cone of said funnel and in large part in the cylinder of said funnel, said mercury alone thus providing an extensive cylinder wall gas seal and thus making a surface tensed line contact with said funnel juncture to augment said gas seal with respect to said funnel, said mercury and its seal being sufficient to force gas to bubble up through the mercury without disturbing said seal under normal operating pressures, a substantial size open chamber above said mercury without immediate restriction on said mercury whereby a sudden oversurge of pressure will result in lifting, spreading and thinning said mercury to allow passage of said oversurge, a filter for preventing downward passage of said mercury, said filter being formed with vertical straight passages therethrough, individually and collectively of uniform diameter, providing said filter with voids of the order of 80%, and a duplicate of said funnel cylinder and filter above said open chamber whereby sudden surge passage of mercury out of the rectifier is prevented and whereby the rectifier may be used with either end up, with the same body of mercury in both cases.

References Cited in the file of this patent

UNITED STATES PATENTS

| 2,693,198 | Heath | Nov. 2, 1954 |
| 2,719,206 | Gilmore | Sept. 27, 1955 |
| 2,719,537 | Gildersleeve | Oct. 4, 1955 |
| 2,834,366 | Bond | May 13, 1958 |
| 2,849,018 | Donegan | Aug. 26, 1958 |
| 2,875,144 | Karler | Feb. 24, 1959 |

FOREIGN PATENTS

| 919,512 | Germany | Oct. 25, 1954 |